United States Patent
Sivasankar et al.

(10) Patent No.: US 9,876,739 B2
(45) Date of Patent: Jan. 23, 2018

(54) SYSTEM AND METHOD FOR FAILURE DETECTION IN RINGS

(71) Applicant: DELL PRODUCTS L.P., Round Rock, TX (US)

(72) Inventors: Ravikumar Sivasankar, Chennai (IN); Purushothaman Nandakumaran, San Jose, CA (US); Joyas Joseph, Fremont, CA (US); William Zengli Yu, Los Gatos, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 189 days.

(21) Appl. No.: 13/906,072

(22) Filed: May 30, 2013

(65) Prior Publication Data

US 2014/0359364 A1    Dec. 4, 2014

(51) Int. Cl.
*H04L 12/939*    (2013.01)
*H04L 12/437*    (2006.01)
*H04L 12/933*    (2013.01)

(52) U.S. Cl.
CPC .......... *H04L 49/555* (2013.01); *H04L 12/437* (2013.01); *H04L 49/102* (2013.01); *H04L 49/557* (2013.01)

(58) Field of Classification Search
CPC ....... H04L 2012/421; H04L 2012/5627; H04L 45/00; H04L 45/02; H04L 45/26; H04L 45/28; H04L 43/00; H04L 43/10
USPC ....... 370/241, 216, 217, 218, 221, 222, 242, 370/244, 248, 250
See application file for complete search history.

(56) References Cited

U.S. PATENT DOCUMENTS

| | | | |
|---|---|---|---|
| 2003/0043738 A1* | 3/2003 | Barsheshet | H04L 12/437 370/222 |
| 2003/0152027 A1* | 8/2003 | Takagi | 370/222 |
| 2008/0247393 A1* | 10/2008 | Ong | H04L 45/00 370/392 |
| 2009/0207726 A1* | 8/2009 | Thomson et al. | 370/216 |
| 2009/0268609 A1* | 10/2009 | Koch | H04L 12/423 370/222 |
| 2010/0296391 A1* | 11/2010 | Ling et al. | 370/217 |
| 2012/0287776 A1* | 11/2012 | Inaba | 370/217 |

(Continued)

FOREIGN PATENT DOCUMENTS

WO    WO 2013053331 A1 *    4/2013    ............. H04L 45/22

*Primary Examiner* — Ricky Ngo
*Assistant Examiner* — Stephen Steiner
(74) *Attorney, Agent, or Firm* — Haynes and Boone, LLP.

(57) ABSTRACT

A system and method of failure detection in rings includes a switch including a control unit, one or more first ports coupled to the control unit and configured to couple the switch to a ring of switches in a first direction, and one or more second ports coupled to the control unit and configured to couple the switch to the ring of switches in a second direction opposite the first direction. The control unit is configured to detect a failure in the ring of switches in the second direction, transmit a request message in the first direction using one of the one or more first ports, receive a response message on one of the one or more first ports, extract reachability data from the response message, and determine one or more first switches in the ring of switches that are reachable in the first direction based on information associated with the reachability data.

14 Claims, 8 Drawing Sheets

(56) References Cited

U.S. PATENT DOCUMENTS

2013/0016617 A1\* 1/2013 Nishikawa .................... 370/243
2014/0254353 A1\* 9/2014 Ye ................................ 370/228

\* cited by examiner

SYSTEM AND METHOD FOR FAILURE DETECTION IN RINGS

BACKGROUND

The present disclosure relates generally to information handling systems, and more particularly to failure detection in rings.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often used to implement the interconnection fabric. This can be further complicated through other networking trends such as parallelization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. In some implementations the parallelization is treated in a more formalized fashion in the form of a ring of associated network switching products. In a ring, multiple network switching products may often cooperate as a single switching entity. Network traffic received at one of the network switching products in the ring may be forwarded in one direction or another around the ring until a second network switching product forwards the network traffic along towards its final destination. Because of the unified nature of the ring, failures in any one of the network switching products in the ring or the network links that interconnect them may impact the ring as a whole.

Accordingly, it would be desirable to provide improved network switching products that can detect failures in a ring.

SUMMARY

According to one embodiment, a switch includes a control unit, one or more first ports coupled to the control unit and configured to couple the switch to a ring of switches in a first direction, and one or more second ports coupled to the control unit and configured to couple the switch to the ring of switches in a second direction opposite the first direction. The control unit is configured to detect a failure in the ring of switches in the second direction, transmit a first request message in the first direction using one of the one or more first ports, receive a first response message on one of the one or more first ports, extract first reachability data from the first response message, and determine one or more first switches in the ring of switches that are reachable in the first direction based on information associated with the first reachability data.

According to another embodiment, a switch includes a control unit, one or more first ports coupled to the control unit and configured to couple the switch to a ring of switches in a first direction, and one or more second ports coupled to the control unit and configured to couple the switch to the ring of switches in a second direction opposite the first direction. The control unit is configured to receive a request message including reachability data on one of the one or more first ports, alter the request message to update the reachability data to include reachability of the switch, and determine whether the altered request message can be forwarded on one of the one or more second ports. When the altered request message can be forwarded on one of the one or more second ports, the control unit is further configured to forward the altered request message on one of the one or more second ports. When the altered request message cannot be forwarded on one of the one or more second ports, the control unit is further configured to convert the altered request message to a first response message and transmit the first response message on one of the one or more first ports.

According to yet another embodiment, a method of detecting failures in a ring includes detecting a failure in a ring of switches, the failure being in a first direction around the ring of switches from a first switch, transmitting a first request message in a second direction using one of one or more first ports of the first switch, the second direction being opposite the first direction, receiving a first response message on one of the one or more first ports, extracting first reachability data from the first response message, and determining one or more second switches in the ring of switches that are reachable in the first direction based on information associated with the first reachability data.

According to yet another embodiment, a method of detecting failures in a ring includes receiving a request message including reachability data on one of the one or more first ports of a first switch, the one or more first ports being in a first direction around a ring of switches from the first switch, altering the request message to update the reachability data to include reachability of the first switch, and determining whether the altered request message can be forwarded in a second direction using one of one or more second ports of the first switch, the second direction being opposite the first direction. When the altered request message can be forwarded on one of the one or more second ports, the method further includes forwarding the altered request message on one of the one or more second ports. When the altered request message cannot be forwarded on one of the one or more second ports, the method further includes converting the altered request message to a first response message and transmitting the first response message on one of the one or more first ports.

According to yet another embodiment, an information handling system includes a ring of switches. The ring of switches includes a first switch and a second switch. The first switch includes a first control unit, one or more first ports coupled to the first control unit and configured to couple the first switch to the ring of switches in a first direction, and one or more second ports coupled to the first control unit and configured to couple the first switch to the ring of switches in a second direction opposite the first direction. The second switch includes a second control unit, one or more third ports coupled to the second control unit and configured to couple the second switch to a ring of switches in the first direction, and one or more fourth ports coupled to the second control unit and configured to couple the second switch to the ring of switches in the second direction. The first control unit is configured to detect a failure in the ring of switches in the second direction, transmit a first request message in the first direction using one of the one or more first ports, receive a first response message on one of the one or more first ports, extract first reachability data from the first response message, and determine one or more first switches in the ring of switches that are reachable in the first direction based on information associated with the first reachability data. The second control unit is configured to receive a second request message including second reachability data on one of the one or more fourth ports, alter the second request message to update the second reachability data to include reachability of the second switch, and determine whether the altered second request message can be forwarded on one of the one or more third ports. When the altered second request message can be forwarded on one of the one or more third ports, the second switch is further configured to forward the altered second request message on one of the one or more third ports. When the altered second request message cannot be forwarded on one of the one or more third ports, the second switch is further configured to convert the altered second request message to the first response message and transmit the first response message on one of the one or more fourth ports. The second switch is further configured to receive a second response message on one of the one or more third ports and forward the second response message on one of the one or more fourth ports.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
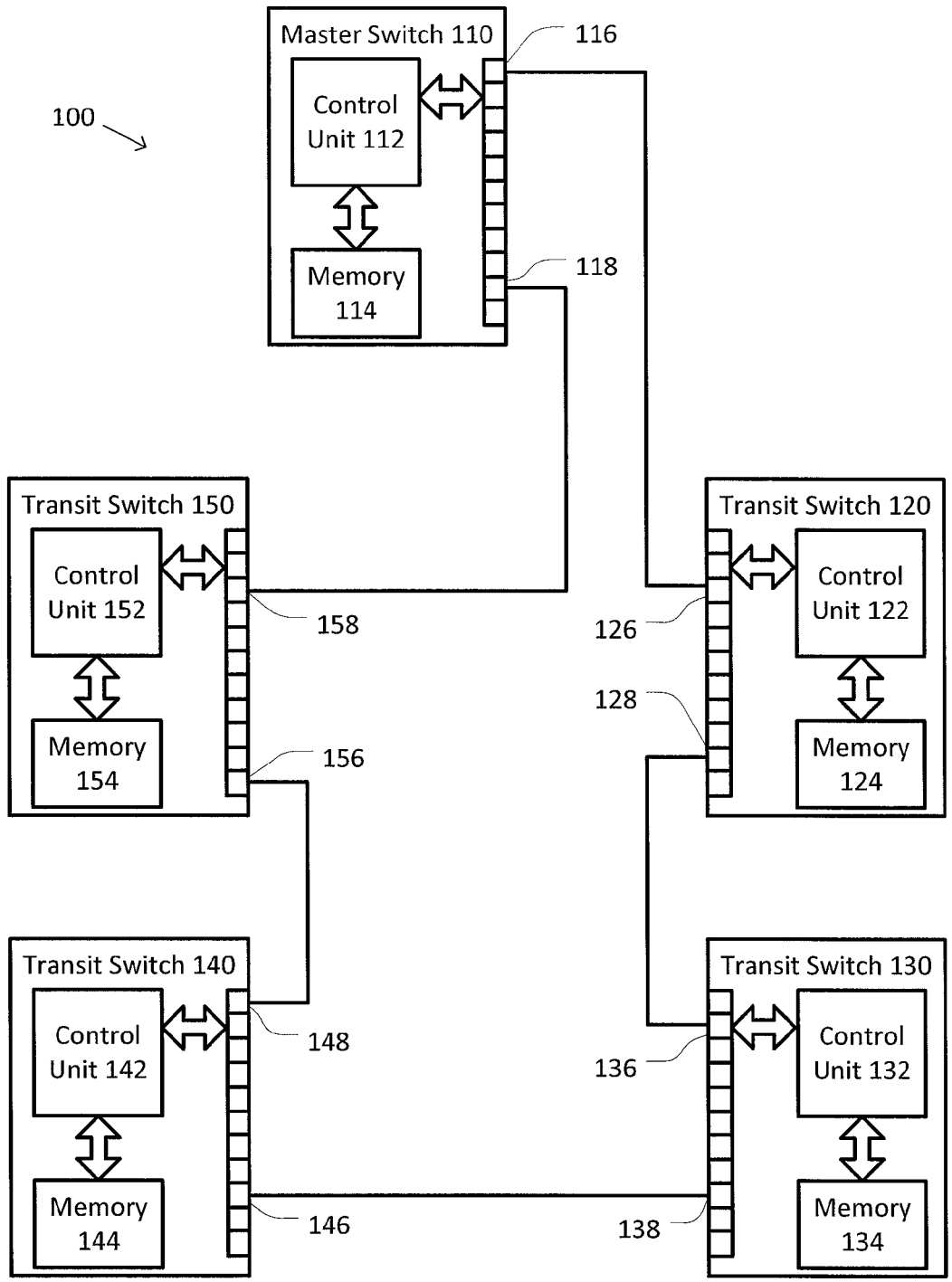
FIG. 1 shows a simplified diagram of a network according to some embodiments.

FIG. 1 shows a simplified diagram of a network 100 according to some embodiments. As shown in FIG. 1, network 100 may include network switching devices or switches 110, 120, 130, 140, and 150 configured to form a ring. And although only five switches are shown in the ring of network 100, it would be understood that the ring of network 100 may include any number of switches. As shown, switch 110 includes a control unit 112 and memory 114. Control unit 112 is coupled to memory 114 and may control the operation of switch 110. In some examples, control unit 112 may be used to make forwarding decisions for network traffic being handled by switch 110. In some examples, control unit 112 may include one or more processors. Switch 110 further includes one or more ports, including ports 116 and 118, for coupling switch 110 to other switches and/or network devices using network links. In some examples, control unit 112 may use one or more protocols to communicate with the other switches and network devices using the one or more ports and network links.

Similarly, switches 120, 130, 140, and 150 each include a control unit 122, 132, 142, and 152, respectively. Switches 120, 130, 140, and 150 each also include memory 124, 134, 144, and 154, respectively. The control units 122, 132, 142, and 152 are each coupled to memory 124, 134, 144, and 154, respectively, and may control the operation of switches 120, 130, 140, and 150, respectively. In some examples, control units 122, 132, 142, and 152 may be used to make forwarding decisions for network traffic being handled by switches 120, 130, 140, and 150, respectively. In some examples, control units 122, 132, 142, and 152 may each include one or more processors. Switch 120 further includes one or more ports, including ports 126 and 128, for coupling switch 120 to other switches and/or network devices using network links. Switch 130 further includes one or more ports, including ports 136 and 138, for coupling switch 130 to other switches and/or network devices using network links. Switch 140 further includes one or more ports, including ports 146 and 148, for coupling switch 140 to other switches and/or network devices using network links. Switch 150 further includes one or more ports, including ports 156 and 158, for coupling switch 150 to other switches and/or network devices using network links. In some examples, control units 122, 132, 142, and 152 may use one or more protocols to communicate with the other switches and network devices using the one or more ports and network links.

The ring of network 100 is formed using various network links that couple switches 110, 120, 130, 140, and 150. As shown in FIG. 1, the network links forming the ring may be described in a clockwise order, even though the arrangement of the ring is determined by the order of the network links and not the physical location of the switches in the ring. Starting with switch 110, port 116 of switch 110 is coupled to port 126 of switch 120. Port 128 of switch 120 is coupled to port 136 of switch 130. Port 138 of switch 130 is coupled to port 146 of switch 140. Port 148 of switch 140 is coupled to port 156 of switch 150. And, completing the ring, port 158 of switch 150 is coupled to port 118 of switch 110. And although only a single network link is depicted between each of the switches 110, 120, 130, 140, and 150 in the ring, it would be understood that any number of parallel network links and corresponding ports may be used to couple any two adjacent switches 110 and 120, 120 and 130, 130 and 140, 140 and 150, and/or 150 and 110. In some examples, the parallel network links may also be grouped using a link aggregation group (LAG) or similar arrangement.

Although not shown in FIG. 1, the ring of network 100 may also include multiple parallel rings. In some examples, one of the parallel rings may be used to form a control ring or a control virtual local area network (VLAN) for exchange of management messages between the switches 110, 120, 130, 140, and 150. In some examples, another of the parallel rings may be used to form a data ring for one or more member VLANs for exchange of other network traffic. In some examples, other of the parallel rings may be used to form a backup ring that may be substituted to recover from a failure in the ring. In some examples, the control ring, the data ring, and the backup ring may share one or more ports and/or one or more network links.

According to some embodiments, network traffic may be forwarded around the ring of network 100 in more than one direction. In some examples, network traffic may only be forwarded in the clockwise direction. As an example, network traffic first received at switch 150 may only be forwarded to switch 130 through switches 110 and 120 in order. In some examples, network traffic may only be forwarded in a counter-clockwise direction. As an example, network traffic first received at switch 150 may only be forwarded to switch 130 through switch 140. In some examples, network traffic may be forwarded in either the clockwise or counter-clockwise directions. As an example, network traffic first received at switch 150 may be forwarded to switch 130 using either switches 110 and 120 in order or using switch 140.

According to some embodiments, different management models may be used to manage the ring of network 100. In some examples, one of the switches in the ring may be designated as a master or controller switch and the others as transit or slave switches. As shown in the embodiments of FIG. 1, switch 110 may be designated as a master switch and switches 120, 130, 140, and 150 as transit switches. In some examples, master switch 110 may have responsibility for overall management of the ring including coordination of routing and/or forwarding data structures. In some examples, master switch 110 may have responsibility for failure detection and recovery. In some examples, a distributed management model (not shown) may be used where each of the switches 110, 120, 130, 140, and 150 coordinate among themselves in the management of the ring.

In some embodiments, any of the memories 114, 124, 134, 144, and/or 154 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
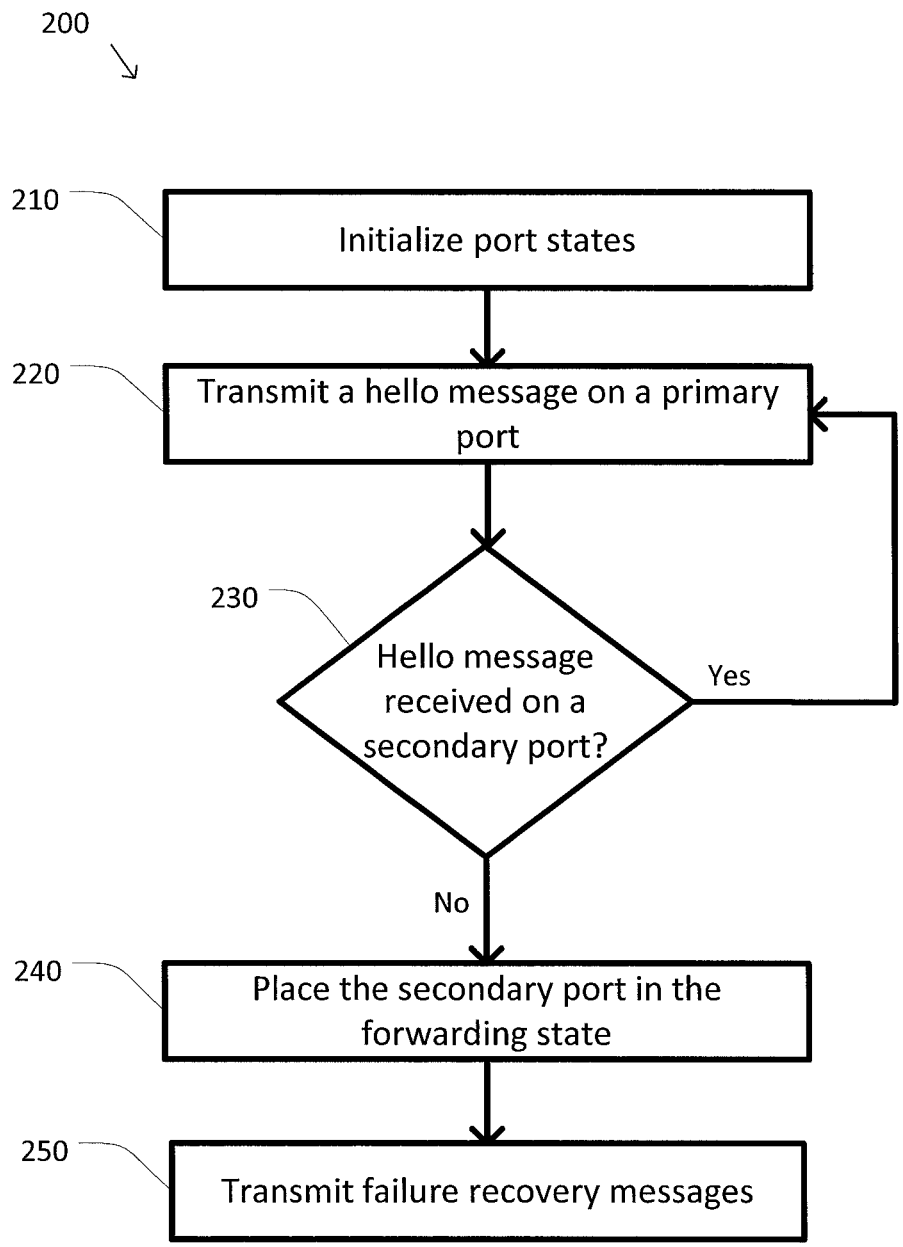
FIG. 2 shows a simplified diagram of a method of detecting ring failures according to some embodiments.

FIG. 2 shows a simplified diagram of a method 200 of detecting ring failures according to some embodiments. As shown in FIG. 2, the method 200 includes a process 210 for initializing port states, a process 220 for transmitting a hello message on a primary port, a process 230 for determining whether the hello message is received on a secondary port, a process 240 for placing the secondary port in the forwarding state, and a process 250 for transmitting failure recovery messages. According to certain embodiments, the method 200 of detecting ring failures can be performed using variations among the processes 210-250 as would be recognized by one of ordinary skill in the art. In some embodiments, the processes 210-250 may only be performed in a master switch (e.g., master switch 110) when a ring includes a master switch. In some embodiments, the processes 210-250 may be performed in any switch (e.g., switches 110, 120, 130, 140, and/or 150) of the ring when the ring uses a distributed management model. In some embodiments, one or more of the processes 210-250 may be implemented, at least in part, in the form of executable code stored on non-transient, tangible, machine readable media that when run by one or more processors (e.g., the one or more processors in the control units 112, 122, 132, 142, and/or 152) may cause the one or more processors to perform one or more of the processes 210-250.

At the process 210, port states are initialized. In some examples, when network traffic is to be forwarded in only one direction around the ring, primary ports of a switch may be placed in the forwarding state and secondary ports may be placed in the blocking state. In some examples, the direction around the ring may be arbitrarily selected from either of the possible directions. In some examples, when network traffic may be forwarded in either direction around the ring, all the ports associated with the ring may be placed in the forwarding state. In some examples, the port states may only be initialized in a control ring portion of the ring. In some examples, the port states may also be initialized in a data ring portion of the ring. In some examples, the ports in the data ring are not placed in the forwarding state until after the ports in the control ring are placed in the forwarding state. In some examples, the ports in the data ring are not placed in the forwarding state until after the method 200 is used to confirm integrity of the control ring.

At the process 220, a hello message is transmitted on a primary port. The hello message is used to by the switch as a periodic mechanism to test integrity of the ring. In some examples, the hello message may be transmitted at regular intervals. In some examples, the regular intervals may be configurable. In some examples, the hello message may be a hello protocol data unit (PDU) of a protocol. In some examples, the protocol may be the Force-10 Redundant Ring Protocol (FRRP). In some examples, when network traffic may be forwarded in either direction around the ring, one of the directions may be chosen and the egress port for the hello message becomes the primary port. In some examples, when the switch includes multiple primary ports, the hello message may be transmitted using any one of the primary ports. In some examples, when the primary ports are associated with a LAG, the hello message may be transmitted using the LAG, which may select from any of the primary ports associated with the LAG. In some examples, the hello message may be transmitted using a control ring.

At the process 230, it is determined whether the hello message is received on a secondary port. In a functioning ring, it is an expectation that the hello message transmitted during process 220 is forwarded around the ring and is eventually received at a secondary port of the switch that originated the hello message. In some examples, when the hello message is able to be forwarded completely around the ring, this may mean that the ring is up and functional. In some examples, when the switch includes multiple secondary ports (e.g., in a LAG), the hello message may be received on any one of the secondary ports. In some examples, when network traffic may be forwarded in either direction around the ring, the secondary port may be determined based on the choice of the primary port during process 220. In some examples, the hello message may be received on the control ring. In some examples, when the hello message is received on the secondary port, the secondary port may be placed in the blocking state.

When the hello message is received on the secondary port, another hello message may be transmitted on the primary port using process 220 after a suitable delay. In some examples, the periodic transmission of hello messages using process 220 and the receiving of the hello messages using process 230 may support continued monitoring of a status of the ring. When the hello message is not received on the secondary port after a suitable delay, the switch may conclude that there is a failure in the ring and begin failure recovery beginning with process 240. Although not shown in FIG. 2, process 230 may include waiting until two, three, or even more consecutive hello messages transmitted during process 220 are not received during process 230 before beginning the failure recovery with process 240.

At the process 240, the secondary port is placed in the forwarding state. When the switch does not receive the hello message during process 230, the switch may conclude that there is a failure in the ring preventing the hello message transmitted during process 220 from being forwarded all the way around the ring. In some examples, the switch may know only that the failure exists, but may not know specifically where the failure is located. To be able to notify all the switches in the ring of the failure, the switch may transmit failure recovery messages on the secondary port as part of the failure recovery. In some examples, when the secondary port is not already in the forwarding state, the switch may place the secondary port in the forwarding state so the secondary port may be used to transmit failure recovery messages.

At the process 250, failure recovery messages are transmitted. The switch may notify the other switches in the ring of the detected failure by transmitting failure recovery messages around the ring. In some examples, the failure recovery messages may include topology change messages. In some examples, the failure recovery messages may be FRRP PDUs. In order to notify all of the other switches in the ring, a first failure recovery message may be transmitted on the primary port and a second failure recovery message may be transmitted on the secondary port. In some examples, this may allow all of the other switches in the ring to receive either the first or the second failure recovery message. The first failure recovery message may be received by each of the other switches between the switch and the failure on the primary port side of the switch and the second failure recovery message may be received by each of the other switches between the switch and the failure on the secondary port side of the switch. This will be addressed in more detail in FIG. 4. In some examples, when the switch includes multiple primary and/or secondary ports (e.g., in LAGs), the first failure recovery message may be transmitted on any one of the primary ports and the second failure recovery message may be transmitted on any one of the secondary ports. In some examples, receipt of one of the failure recovery messages in each of the other switches may trigger a failure recovery process in that switch. In some examples, the failure recovery messages may include instructions to start using a backup ring. In some examples, the failure recovery messages may be transmitted on the control ring.

Figure 3:
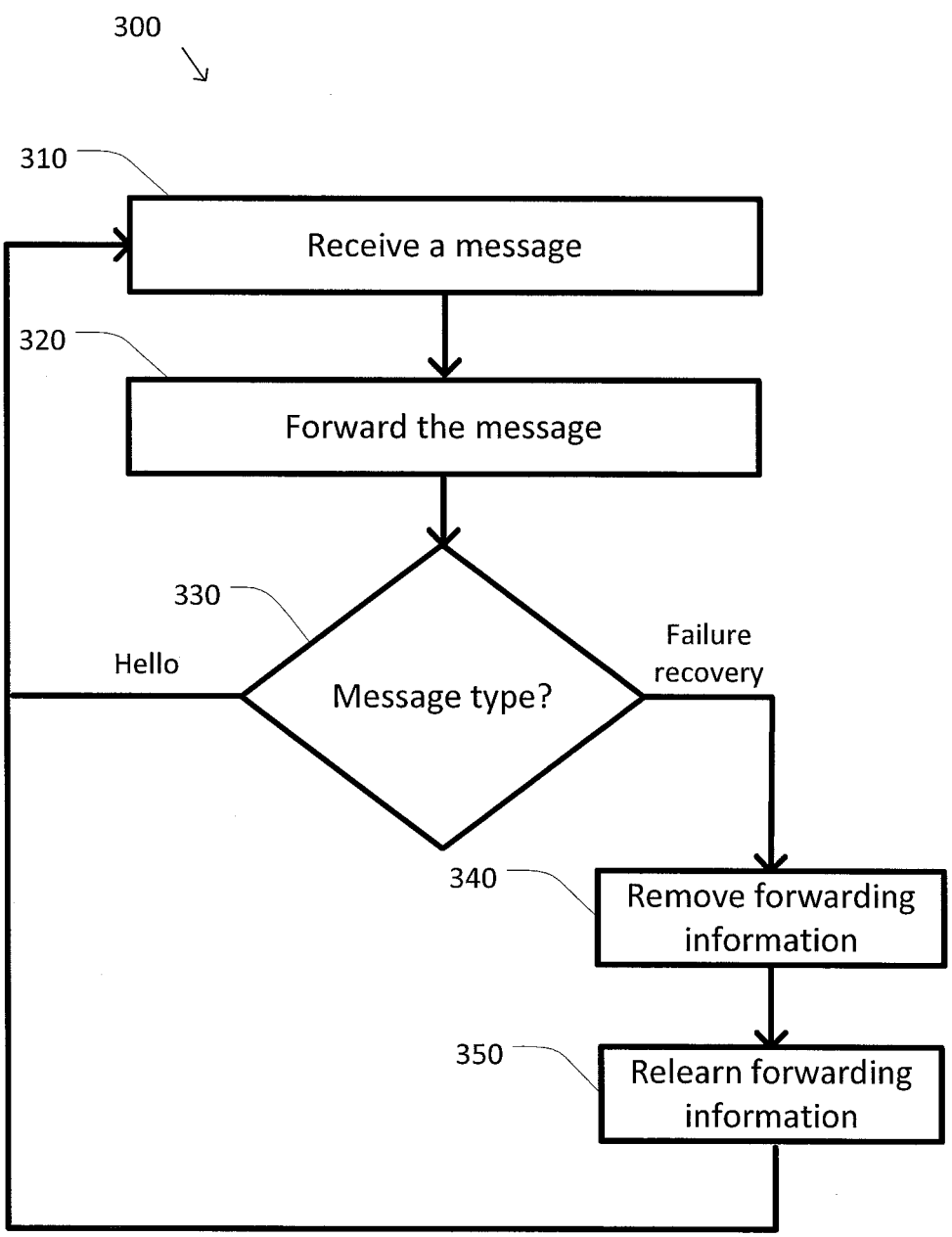
FIG. 3 shows a simplified diagram of a method of detecting ring failures according to some embodiments.

FIG. 3 shows a simplified diagram of a method 300 of detecting ring failures according to some embodiments. As shown in FIG. 3, the method 300 includes a process 310 for receiving a message, a process 320 for forwarding the message, a process 330 for determining a type of the message, a process 340 for removing forwarding information, and a process 350 for relearning forwarding information. According to certain embodiments, the method 300 of detecting ring failures can be performed using variations among the processes 310-350 as would be recognized by one of ordinary skill in the art. In some embodiments, the processes 310-350 may only be performed in a transit switch (e.g., transit switches 120, 130, 140, and/or 150) when a ring includes a master switch. In some embodiments, the processes 310-350 may be performed in any switch (e.g., switches 110, 120, 130, 140, and/or 150) of the ring when the ring uses a distributed management model. In some embodiments, one or more of the processes 310-350 may be implemented, at least in part, in the form of executable code stored on non-transient, tangible, machine readable media that when run by one or more processors (e.g., the one or more processors in the control units 112, 122, 132, 142, and/or 152) may cause the one or more processors to perform one or more of the processes 310-350.

At the process 310, a message is received. In some examples, the message may be received on either a primary port or a secondary port of a switch. In some examples, the message may be a hello message originally transmitted by another switch during process 220. In some examples, the message may be a failure recovery message originally transmitted by another switch during process 250. In some examples, the message may be a message forwarded by another switch during process 320. In some examples, the message may be received on a control ring. In some examples, the message may be a FRRP PDU.

At the process 320, the message is forwarded. The switch may use process 320 to forward the message around the ring to other switches in the ring. In some examples, the message may be forwarded using the control ring. In some examples, when the message received during process 310 is traveling in a first direction around the ring, the message is forwarded in the same direction toward the rest of the ring. For example, a message received by switch 140 on port 148 from switch 150 may be forwarded to switch 130 on port 146. In another example, a message received by switch 140 on port 146 from switch 130 may be forwarded to switch 150 on port 148. In some examples, when the message is received during process 310 on a primary port, the message may be forwarded on a secondary port. In some examples, when the message is received during process 310 on a secondary port, the message may be forwarded on a primary port. In some examples, when the switch includes multiple primary and/or secondary ports (e.g, in LAGs), the message may be forwarded on any one of the primary ports and/or secondary ports based on the direction the message is traveling in the ring. By forwarding the message, the switch does its part in getting the message forwarded to all the switches in the ring.

At the process 330, a type of the message is determined. The type of the message received during process 310 may be determined in order to properly process it. In some examples, the type of the message may be determined using headers and/or other fields included in the message. When the message is a hello message, the switch waits until it receives another message using process 310 before continuing. In some examples, the role of the switch with respect to hello message is to forward them around the ring. When the message is an error recovery message, the switch may begin the error recovery process beginning with process 340.

At the process 340, forwarding information is removed. When the message received during process 310 is an error recovery message, the switch may assume that a failure exists in the ring. As a result, any forwarding information the switch has learned about its network may no longer be valid and the switch removes that information. In some examples, the forwarding information may be removed from forwarding data structures stored in the switch. In some examples, the forwarding data structures may be stored in memory included in the switch (e.g., memory 114, 124, 134, 144, and/or 154).

At the process 350, forwarding information is relearned. In some examples, after the forwarding information is deleted during process 340, the switch may relearn the forwarding information for the network using any suitable process. In some examples, the failure recovery message received during process 310 may include new forwarding information. In some examples, the new forwarding information may include instructions to begin using a backup ring.

Figure 4:
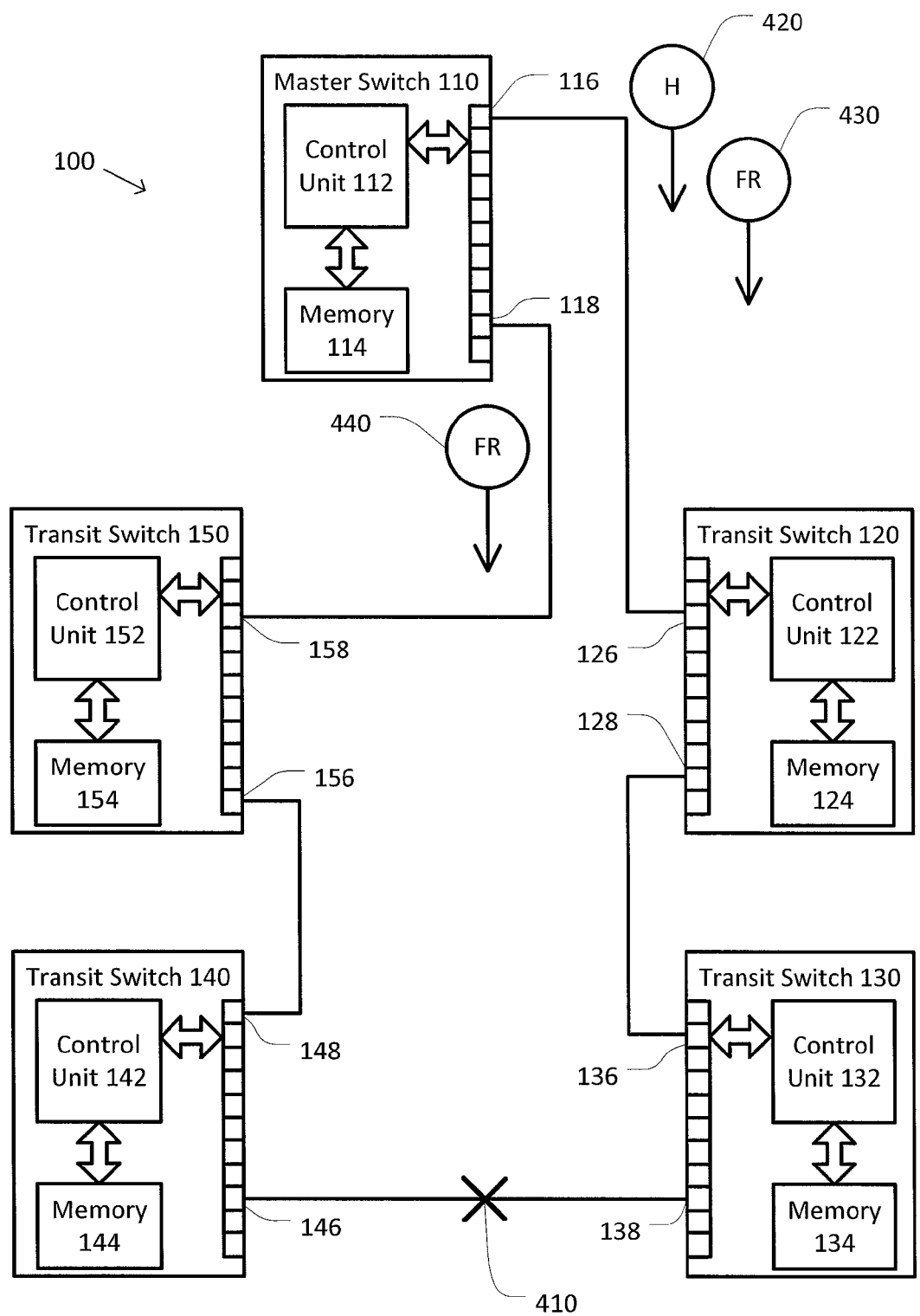
FIG. 4 shows a simplified diagram of the network of FIG. 1 with a failure in a ring according to some embodiments.

FIG. 4 shows a simplified diagram of the network 100 of FIG. 1 with a failure in a ring according to some embodiments. As shown in FIG. 4, network 100 includes switches 110, 120, 130, 140, and 150 configured to form a ring. Switch 110 is designated as master switch 110, and switches 120, 130, 140, and 150 are designated as transit switches. Additionally, port 116 of switch 110 is a primary port 116 and port 118 is a secondary port 118. As shown, switch 110 is performing the method 200 and switches 120, 130, 140, and 150 are performing the method 300. The ring of network 100 also has a failure 410 in the network link between port 138 of switch 130 and port 146 of switch 140. Although shown as failure 410 in the network link, failure 410 may occur in other places. In some examples, failure 410 may be in port 138. In some examples, failure 410 may be in port 146.

Using process 210, switch 110 places primary port 116 in the forwarding state and secondary port 118 in the blocking state. Using process 220, switch 110 transmits the hello message 420 using primary port 116. The hello message 420 is received by switch 120 on port 126 using process 310. Once received, switch 120 forwards the hello message 420 on port 128 toward switch 130 using process 320. The hello message 420 is then received by switch 130 on port 136 using process 310. Switch 130, however, is unable to forward the hello message 420 to switch 140 due to the failure 410. As a consequence, master switch 110 does not receive the hello message 420 on secondary port 118 and process 230 is used by switch 110 to determine that there is a failure (e.g., the failure 410) in the ring.

Master switch 110 responds to the detected failure by placing the secondary port 118 in the forwarding state using process 240 and transmits a failure recovery message 430 on primary port 116 and a failure recovery message 440 on the secondary port 118 using process 250. Failure recovery message 430 is received by switch 120 on port 126 using process 310 where switch 120 forwards failure recovery message 430 on port 128 using process 320. Switch 120 further determines that failure recovery message 430 is a failure recovery message using process 330 and deletes its forwarding information using process 340 and begins relearning the forwarding information using process 350. Failure recovery message 430 is further received by switch 130 on port 136 using process 310. Switch 130 is unable to forward failure recovery message 430 due to failure 410, but is able to delete and begin relearning its forwarding information. Similarly, failure recovery message 440 is eventually received by switches 150 and 140 using processes 310 and 320. Switches 150 and 140 also delete and being relearning their forwarding information using processes 340 and 350.

Thus, the methods 200 and 300 may be used by the switches 110, 120, 130, 140, and 150 of network 100 to detect failure 410 in the ring. Methods 200 and 300 may also be used to notify each and every switch in the ring of the detected failure.

Figure 5:
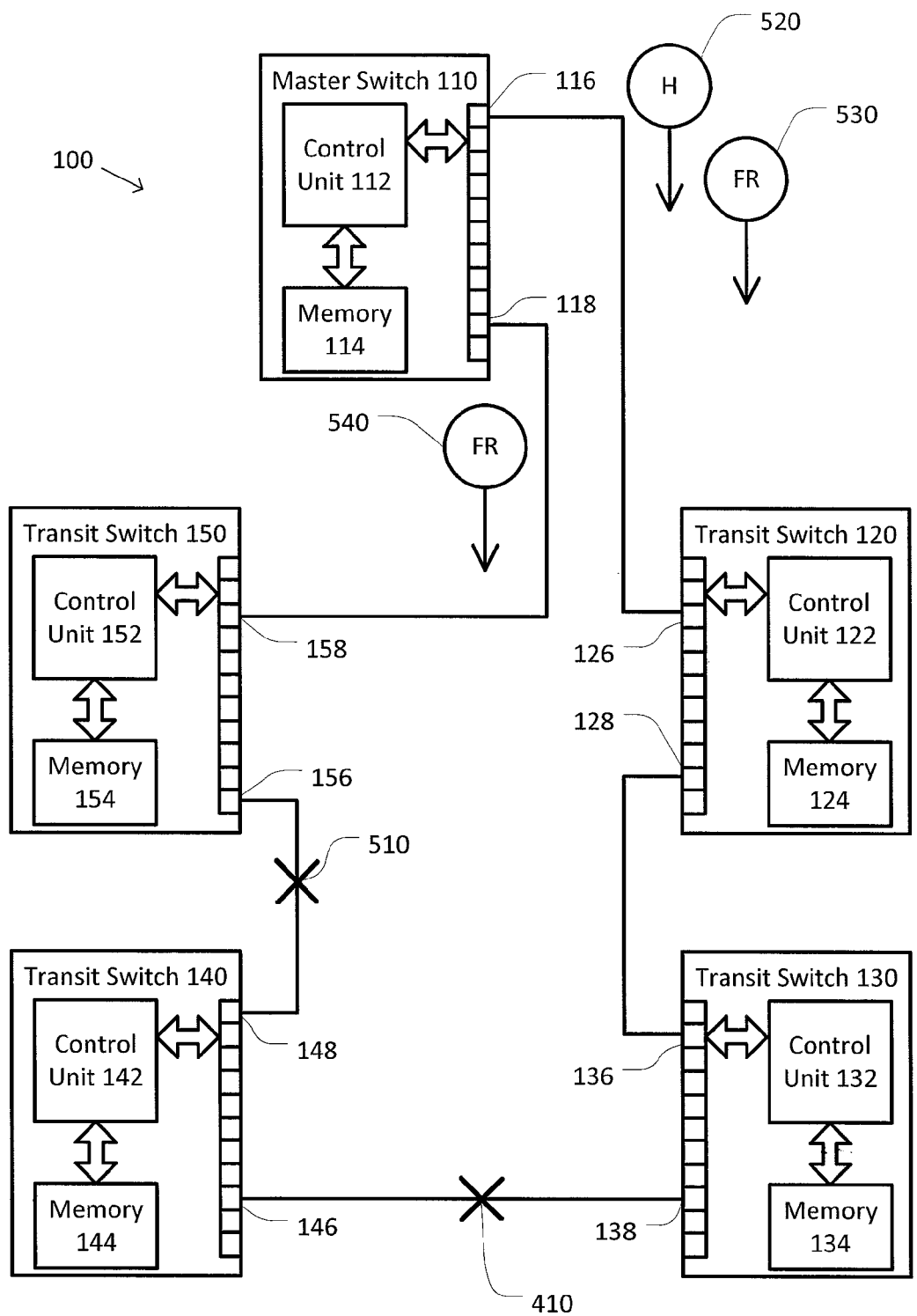
FIG. 5 shows a simplified diagram of the network of FIG. 1 with multiple failures in a ring according to some embodiments.

FIG. 5 shows a simplified diagram of the network 100 of FIG. 1 with multiple failures in a ring according to some embodiments. As shown in FIG. 5, network 100 now includes multiple failures. A first failure is failure 410 in the network link between port 138 of switch 130 and port 146 of switch 140 as also shown in FIG. 4. A second failure 510 is also located in the network link between port 148 of switch 140 and port 156 of switch 150. Although shown as failure 510 in the network link, failure 510 may occur in other places. In some examples, failure 510 may be in port 148. In some examples, failure 510 may be in port 156. As also shown, master switch 110 is performing method 200 and switches 120, 130, 140, and 150 are performing method 300.

As with the embodiments shown in FIG. 4, master switch 110 transmits a hello message 520 using process 210. Hello message 520 is then forwarded using the processes 310 and 320 through switch 120 to switch 130 where it cannot be further forwarded due to failure 410. Master switch 110, therefore, does not receive hello message 520 on secondary port 118 and begins the failure recovery process.

Master switch 110 transmits failure recovery message 530 on primary port 116 and failure recovery message 540 on secondary port 118 using process 250. Failure recovery message 530 is then forwarded using processes 310 and 320 through switch 120 to switch 130 where it may not be further forwarded due to failure 410. Consequently, both switches 120 and 130 receive failure recovery message 530 and begin their respective failure recovery processes. Similarly, failure message 540 is received on port 158 of switch 150 using process 310, but may not be further forwarded due to failure 510. Consequently, only switch 150 receives failure recovery message 540 on the secondary port side of master switch 110, and switch 140 does not receive either failure recovery message 530 or failure recovery message 540 and may not begin its failure recovery process. This creates an island in the ring which isolates switch 140 from receiving important messages, such as failure recovery messages 430 and/or 440. Additionally, as more failures occur in the ring more islands may be created. In some examples, this may be undesirable as switch 140 does not begin its failure recovery process and master switch 110 may be unaware that switch 140 may not be notified of the failure detected by master switch 110.

Figure 6:
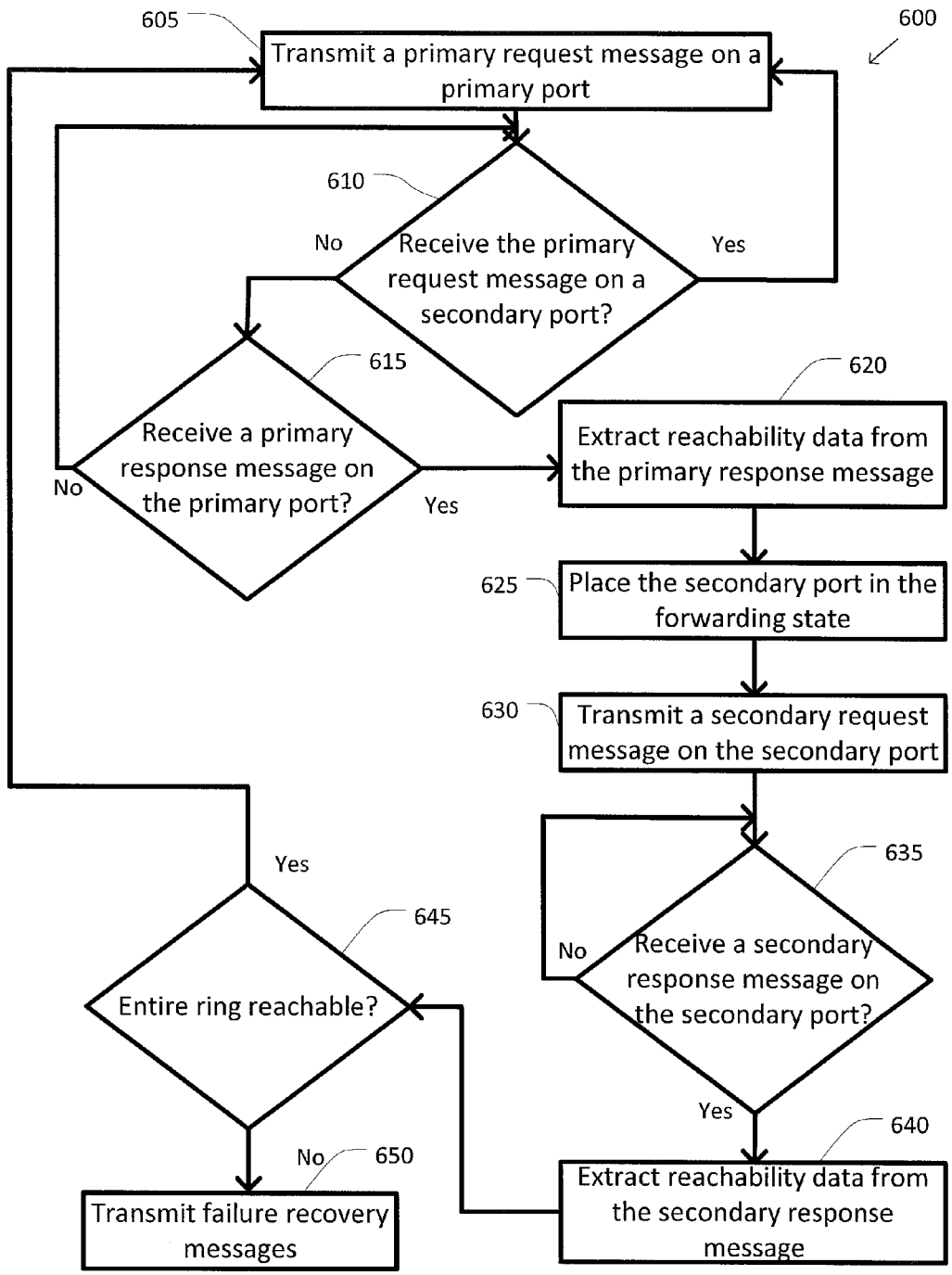
FIG. 6 shows a simplified diagram of a method of detecting ring failures according to some embodiments.

FIG. 6 shows a simplified diagram of a method 600 of detecting ring failures according to some embodiments. As shown in FIG. 6, the method 600 includes a process 605 for transmitting a primary request message on a primary port, a process 610 for determining whether the primary request message is received on a secondary port, a process 615 for determining whether a primary response message is received on the primary port, a process 620 for extracting reachability data from the primary response message, a process 625 for placing the secondary port in the forwarding state, a process 630 for transmitting a secondary request message on the secondary port, a process 635 for determining whether a secondary response message is received on the secondary port, a process 640 for extracting reachability data from the secondary response message, a process 645 for determining whether the entire ring is reachable, and a process 650 for transmitting failure recovery messages. According to certain embodiments, the method 600 of detecting ring failures can be performed using variations among the processes 605-650 as would be recognized by one of ordinary skill in the art. In some embodiments, the processes 605-650 may only be performed in a master switch (e.g., master switch 110) when a ring includes a master switch. In some embodiments, the processes 605-650 may be performed in any switch (e.g., switches 110, 120, 130, 140, and/or 150) of the ring when the ring uses a distributed management model. In some embodiments, one or more of the processes 605-650 may be implemented, at least in part, in the form of executable code stored on non-transient, tangible, machine readable media that when run by one or more processors (e.g., the one or more processors in the control units 112, 122, 132, 142, and/or 152) may cause the one or more processors to perform one or more of the processes 605-650.

At the process 605, a primary request message is transmitted on a primary port. The primary request message is used to by the switch as a periodic mechanism to test integrity of the ring. In some examples, the primary request message may include initialized reachability data. In some examples, the primary request message may include a header indicating that it is a request message. In some examples, the primary request message may be transmitted at regular intervals. In some examples, the regular intervals may be configurable. In some examples, the primary request message may be a primary request protocol data unit (PDU) of a protocol. In some examples, the protocol may be the FRRP. In some examples, when network traffic may be forwarded in either direction around the ring, one of the directions may be chosen and the egress port for the primary request message becomes the primary port. In some examples, when the switch includes multiple primary ports, the primary request message may be transmitted using any one of the primary ports. In some examples, when the primary ports are associated with a LAG, the primary request message may be transmitted using the LAG, which may select from any of the primary ports associated with the LAG. In some examples, the primary request message may be transmitted using a control ring.

At the process 610, it is determined whether the primary request message is received on a secondary port. In a functioning ring, it is an expectation that the primary request message transmitted during process 605 is forwarded around the ring and is eventually received at a secondary port of the switch that originated the primary request message. In some examples, when the primary request message is able to be forwarded completely around the ring, this may mean that the ring is up and functional. In some examples, when the switch includes multiple secondary ports (e.g., in a LAG), the primary request message may be received on any one of the secondary ports. In some examples, when network traffic may be forwarded in either direction around the ring, the secondary port may be determined based on the choice of the primary port during process 605. In some examples, the primary request message may be received on the control ring.

When the primary request message is received on the secondary port, another primary request message may be transmitted on the primary port using process 605 after a suitable delay. In some examples, the periodic transmission of primary request messages using process 605 and the receiving of the primary request messages using process 610 may support continued monitoring of a status of the ring. When the primary request message is not received on the secondary port after a suitable delay, the switch may conclude that there is a failure in the ring and begin failure recovery beginning with process 615. Although not shown in FIG. 6, process 610 may include waiting until two, three, or even more consecutive primary request messages transmitted during process 605 are not received during process 610 before beginning the failure recovery with process 615.

At the process 615, it is determined whether a primary response message is received on the primary port. Reception of the primary response message on the primary port indicates that one of the switches in the ring was unable to forward the primary request message transmitted during process 605. When the primary response message is received, reachability data in the primary response message may be extracted using process 620. When the primary response message is not received, process 610 may be used again to determine whether the primary request message is received.

At the process 620, reachability data is extracted from the primary response message. As the primary request message transmitted during process 605 is forwarded around the ring, each of the switches that receive the primary request message may alter the primary request message to include reachability data as will be discussed in further detail in FIG. 7. Because the reachability data from the primary request message is also included in the primary response message, the switch may extract the reachability data from the primary response message.

In some embodiments, the reachability data includes an indication of all the switches in the ring that can be reached from the primary port side of the switch. In some examples, the reachability data may include a count of a number of switches that received the primary request message. By examining the count, the switch may determine how many switches are reachable to the primary port side of the switch. In some examples, when the reachability data is initialized during process 605, the count may be set to zero.

In some examples, the reachability data may include a bitmap with one bit reserved for each of the switches in the ring. By examining which bits are active and which are not, the switch may determine which switches may be reached to the primary port side of the switch. In some examples, bits are active when they are logic 1. In some examples, bits are active when they are logic 0. In some examples, when the reachability data is initialized during process 605, each of the bits in the bitmap may be set to inactive.

In some examples, the reachability data may include a route trace with an entry appearing for each switch that received the primary request message. By examining each entry in the route trace, the switch may determine which switches may be reached to the primary port side of the switch. In some examples, when the reachability data is initialized during process 605, all route trace entries may be removed.

In some examples, other data structures and/or fields in the primary request message may be used to record the reachability data.

As an example, when the primary request message is transmitted in place of hello message 420 and/or hello message 520 of FIGS. 4 and 5 respectively, the primary response message received during process 615 may include a count of two (for switches 120 and 130), active bits for switches 120 and 130, or route trace entries for switches 120 and 130 depending on which reachability data type is included in the primary response message. By extracting the reachability data, the switch may learn that switches 120 and 130 are reachable to the primary port side.

At the process 625, the secondary port is placed in the forwarding state. As a result of receiving the primary response message during process 615, the switch may conclude that there is a failure in the ring preventing the primary request message transmitted during process 605 from being forwarded all the way around the ring. To be able to notify all the switches in the ring of the failure, the switch may transmit additional messages on the secondary port. In some examples, when the secondary port is not already in the forwarding state, the switch may place the secondary port in the forwarding state so the secondary port may be used to transmit additional messages.

At the process 630, a secondary request message is transmitted on the secondary port. The secondary request message is used to by the switch to determine which switches in the ring are reachable from the secondary port side. In some examples, the secondary request message may include initialized reachability data. In some examples, the secondary request message may include a header indicating that it is a request message. In some examples, the secondary request message may be transmitted at regular intervals. In some examples, the regular intervals may be configurable. In some examples, the secondary request message may be a secondary request protocol data unit (PDU) of a protocol. In some examples, the protocol may be the FRRP. In some examples, when the switch includes multiple secondary ports, the secondary request message may be transmitted using any one of the secondary ports. In some examples, when the secondary ports are associated with a LAG, the secondary request message may be transmitted using the LAG, which may select from any of the secondary ports associated with the LAG. In some examples, the secondary request message may be transmitted using a control ring.

At the process 635, it is determined whether a secondary response message is received on the secondary port. In some examples, when the switch includes multiple secondary ports (e.g., in a LAG), the secondary response message may be received on any one of the secondary ports. In some examples, the secondary response message may be received on the control ring. When the secondary response message is received on the secondary port, reachability data included in the secondary response message may be extracted using process 640. When the secondary response message is not received on the secondary port, the switch may continue to wait for the secondary response message to be received.

At the process 640, reachability data is extracted from the secondary response message. As the secondary request message transmitted during process 630 is forwarded around the ring, each of the switches that receive the secondary request message may alter the secondary request message to include reachability data as will be discussed in further detail in FIG. 7. Because the reachability data from the secondary request message is also included in the secondary response message, the switch may extract the reachability data from the secondary response message. In some examples, the reachability data may indicate which switches of the ring are reachable on the secondary port side of the switch.

As an example, when the secondary request message is transmitted in place of failure recovery message 440 of FIG. 4, the secondary response message received during process 640 may include a count of two (for switches 150 and 140), active bits for switches 150 and 140, or route trace entries for switches 150 and 140 depending on which reachability data type is included in the secondary response message. By extracting the reachability data, the switch may learn that switches 150 and 140 are reachable to the secondary port side.

As another example, when the secondary request message is transmitted in place of failure recovery message 540 of FIG. 5, the secondary response message received during process 640 may include a count of one (for switch 150), an active bit for switch 150, or a route trace entry for switch 150 depending on which reachability data type is included in the secondary response message. By extracting the reachability data, the switch may learn that switch 150 is reachable to the secondary port side.

At the process 645, it is determined whether the entire ring is reachable. Using the reachability data extracted during process 620 and the reachability data extracted during process 640, the switch may determine whether each switch in the ring is reachable. When the entire ring is not reachable, error recovery messages are transmitted using process 650. When the entire ring is reachable, a new primary request message is transmitted using process 605.

As an example, when process 645 is performed by master switch 110 in FIG. 4, the reachability data extracted during process 620 indicates that switches 120 and 130 are reachable on the primary port side, and the reachability data extracted during process 640 indicates that switches 150 and 140 are reachable on the secondary port side. Because switches 120, 130, 140, and 150 represent all the other switches in the ring, master switch 110 may determine that despite failure 410, each of the switches in the ring are still reachable.

As an example, when process 645 is performed by master switch 110 in FIG. 5, the reachability data extracted during process 620 indicates that switches 120 and 130 are reachable on the primary port side, and the reachability data extracted during process 640 indicates that switch 150 is reachable on the secondary port side. Because switch 140 is no longer reachable using the ring, master switch 110 may determine that switch 140 is part of an island and transmit failure recovery messages using process 650.

At the process 650, failure recovery messages are transmitted. The switch may notify the other switches in the ring of the detected failures by transmitting failure recovery messages to each of the switches in the ring. In some examples, the failure recovery messages may include topology change messages. In some examples, the failure recovery messages may be FRRP PDUs. In order to notify all of the other switches in the ring, failure recovery messages may be transmitted on both the primary port and the secondary port to reach the switches that are reachable using the ring. Additional failure recovery messages may be transmitted to any switches that are part of an island using other network links that are not part of the ring. In some examples, receipt of one of the failure recovery messages in each of the other switches may trigger a failure recovery process in that switch. In some examples, the failure recovery messages may include instructions to start using a backup ring.

Figure 7:
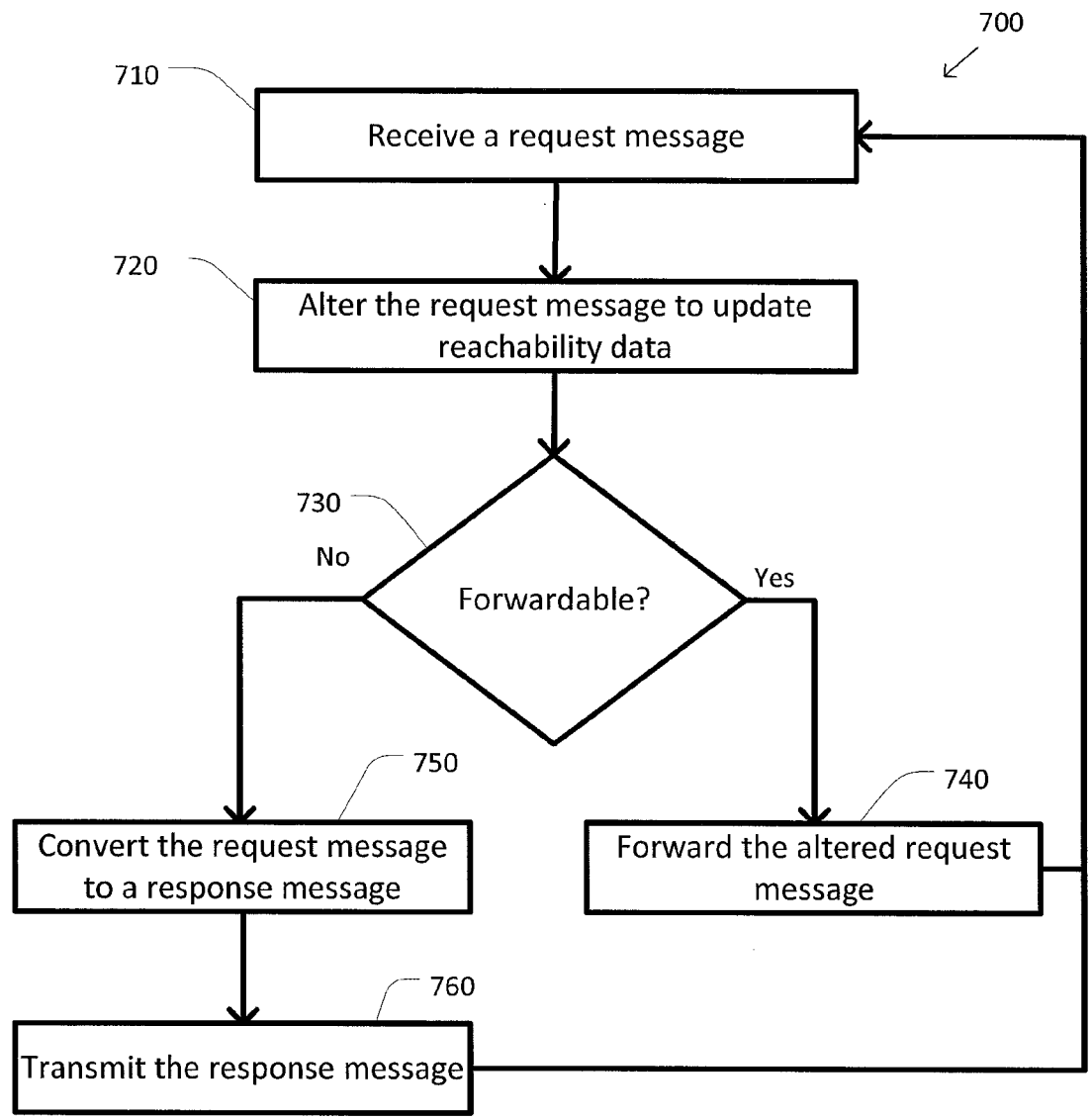
FIG. 7 shows a simplified diagram of a method of detecting ring failures according to some embodiments.

FIG. 7 shows a simplified diagram of a method 700 of detecting ring failures according to some embodiments. As shown in FIG. 7, the method 700 includes a process 710 for receiving a request message, a process 720 for altering the request message to update reachability data, a process 730 for determining whether the request message is forwardable, a process 740 for forwarding the altered request message, a process 750 for converting the request message to a response message, and a process 760 for transmitting the response message. According to certain embodiments, the method 700 of detecting ring failures can be performed using variations among the processes 710-760 as would be recognized by one of ordinary skill in the art. In some embodiments, the processes 710-760 may only be performed in a transit switch (e.g., transit switches 120, 130, 140, and/or 150) when a ring includes a master switch. In some embodiments, the processes 710-760 may be performed in any switch (e.g., switches 110, 120, 130, 140, and/or 150) of the ring when the ring uses a distributed management model. In some embodiments, one or more of the processes 710-760 may be implemented, at least in part, in the form of executable code stored on non-transient, tangible, machine readable media that when run by one or more processors (e.g., the one or more processors in the control units 112, 122, 132, 142, and/or 152) may cause the one or more processors to perform one or more of the processes 710-760.

At the process 710, a request message is received. In some examples, the request message may be received on either a primary port or a secondary port of a switch. In some examples, the request message may be a primary request message originally transmitted by another switch during process 605 or a secondary request message originally transmitted by another switch during process 630. In some examples, the request message may be a request message forwarded by another switch using process 740. In some examples, the request message may be received on a control ring. In some examples, the request message may be a FRRP PDU.

At the process 720, the request message is altered to update reachability data. The switch may update the reachability data in the request message to indicate that the switch has received the request message. When the reachability data includes a count, the count may be incremented by the switch. When the reachability data includes a bitmap, a bit corresponding to the switch may be changed to active. When the reachability data includes a route trace, a route trace entry for the switch may be inserted into the request message.

At the process 730, it is determined whether the request message is forwardable. In some examples, the request message may be forwardable when a next switch in the ring is reachable. When the request message is forwardable, the request message is forwarded using process 740. When the request message is not forwardable, the request message is converted to a response message using process 750.

At the process 740, the altered request message is forwarded. The switch may use process 740 to forward the message around the ring to other switches in the ring so that each in turn may update the reachability data. In some examples, the altered request message may be forwarded using the control ring. In some examples, when the request message received during process 710 is traveling in a first direction around the ring, the update request message is forwarded in the same direction toward the rest of the ring. For example, a request message received by switch 140 on port 148 from switch 150 may be forwarded as an altered request message to switch 130 on port 146. In another example, a request message received by switch 140 on port 146 from switch 130 may be forwarded as an altered request message to switch 150 on port 148. In some examples, when the request message is received during process 710 on a primary port, the altered request message may be forwarded on a secondary port. In some examples, when the request message is received during process 710 on a secondary port, the altered request message may be forwarded on a primary port. In some examples, when the switch includes multiple primary and/or secondary ports (e.g., in LAGs), the altered request message may be forwarded on any one of the primary ports and/or secondary ports based on the direction the request message is traveling in the ring.

At the process 750, the request message is converted to a response message. Because the request message is not forwardable, the switch may return the reachability data included in the request message back to the another switch that first transmitted the request message. In some examples, the request message is converted to the response message by altering a header to identify the response message as a response message. In some examples, the response message includes all of the reachability data received during process 710 as well as the alterations performed during process 720.

At the process 760, the response message is transmitted. The switch transmits the response message back to the another switch that first transmitted the request message. The response message is transmitted on the same port on which the request message was received during process 710. In some examples, the message may be forwarded using the control ring. In some examples, when the message is received during process 710 is traveling in a first direction around the ring, the response message is transmitted in the opposite direction back toward where the request message came from. For example, a request message received by switch 140 on port 148 from switch 150 may result in a response message being transmitted back to switch 150 on port 148. In another example, a request message received by switch 140 on port 146 from switch 130 may result in a response message being transmitted back to switch 130 on port 146. In some examples, when the switch includes multiple primary and/or secondary ports (e.g., in LAGs), the response message may be transmitted on any one of the primary ports and/or secondary ports based on the direction the response message is to be returned.

As discussed above and further emphasized here, FIGS. 6 and 7 are merely examples which should not unduly limit the scope of the claims. One of ordinary skill in the art would recognize many variations, alternatives, and modifications. In some embodiments, method 600 may further include a process for verifying the ring using reachability data included in the primary request message received during process 610. In some examples, the switch may use the count in the received primary request message to verify that an expected number of switches are found in the ring. In some examples, the switch may use the bitmap and/or the route trace entries to determine whether each of the switches that may be in the ring have altered the reachability data accordingly in the respective processes 720.

In some embodiments, method 600 may further include a process for determining that when the primary response message is not received during process 615 and the primary request message is not received during process 610 that no switches are reachable on the primary port side of the switch. Similarly, in some embodiments, method 600 may further include a process for concluding that when the secondary response message is not received during process 635 that no switches are reachable on the secondary port side of the switch.

In some embodiments, method 600 may further include a process for determining that when the secondary request message transmitted during process 630 is received on the primary port that the ring includes no failures because the secondary request message is forwarded around the entire ring. In some examples, the method 600 may further include a process for verifying the ring using reachability data included in the secondary request message.

In some embodiments, method 700 may further include processes similar to those included in method 300 to forward response messages that are received and to begin a failure recovery process when a failure recovery message transmitted during process 650 is received.

Figure 8:
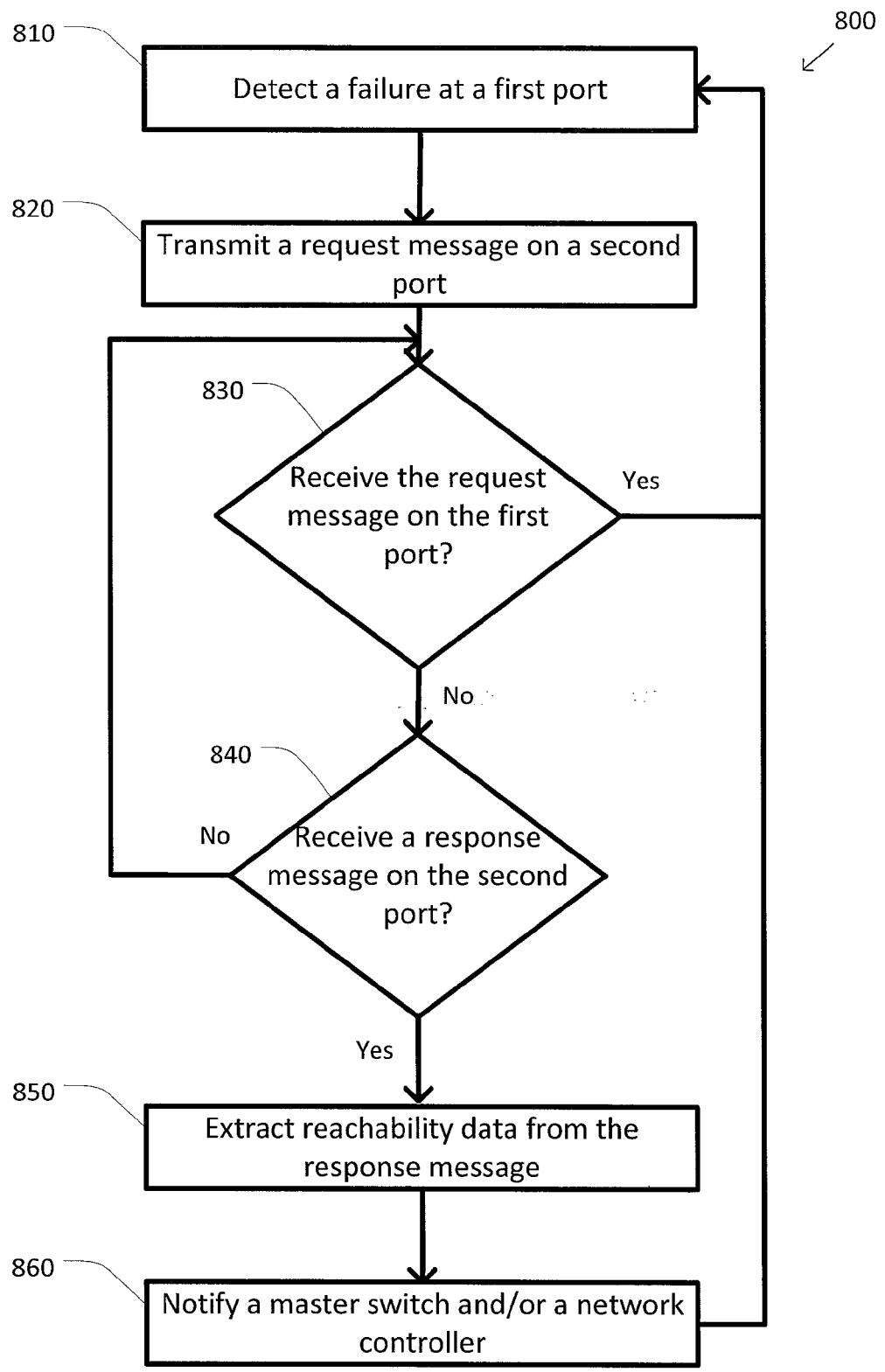
FIG. 8 shows a simplified diagram of a method of detecting ring failures according to some embodiments.

FIG. 8 shows a simplified diagram of a method 800 of detecting ring failures according to some embodiments. As shown in FIG. 8, the method 800 includes a process 810 for detecting a failure at a first port, a process 820 for transmitting a request message on a second port, a process 830 for determining whether the request message is received on the first port, a process 840 for determining whether a response message is received on the second port, a process 850 for extracting reachability data from the response message, and a process 860 for notifying a master switch and/or a network controller. According to certain embodiments, the method 800 of detecting ring failures can be performed using variations among the processes 810-860 as would be recognized by one of ordinary skill in the art. In some embodiments, the processes 810-860 may be performed in any switch (e.g., switches 110, 120, 130, 140, and/or 150) of the ring when the ring uses a distributed management model. In some embodiments, process 860 is optional and may be omitted. In some embodiments, one or more of the processes 810-860 may be implemented, at least in part, in the form of executable code stored on non-transient, tangible, machine readable media that when run by one or more processors (e.g., the one or more processors in the control units 112, 122, 132, 142, and/or 152) may cause the one or more processors to perform one or more of the processes 810-860.

At the process 810, a failure is detected at a first port. A switch may detect a failure at the first port that couples the switch to another switch or network device using one of many possible protocols. In some examples, the switch may exchange heartbeat messages with a neighboring switch and several missed heartbeat message may indicate a failure. In some examples, the failure may be in the first port, a network link, and/or the neighboring switch. In some examples, when the first port is part of a LAG, the failure may not be detected until all the ports in the LAG are failed and/or down. In some examples, the failure may be detected by both switches coupled via a network link. In some examples, when both switches detect the failure, each may perform method 800. In some examples, the first port may form part of a ring. In some examples, the failure may be failure 410 and the first port may be port 138 or port 146. In some examples, the failure may be failure 520 and the first port may be port 148 or port 156.

At the process 820, a request message is transmitted on a second port. In some examples, when the first port couples the switch in a first direction around the ring, the second port couples the switch in a second direction around the ring where the second direction is opposite the first direction. In some examples, when the first port is port 138, the second port is port 136. In some examples, when the first port is port 156, the second port is port 158. The request message is used by the switch to determine reachability of other switches in the ring. In some examples, the request message may include initialized reachability data. In some examples, the request message may include a header indicating that it is a request message. In some examples, the request message may be a request protocol data unit (PDU) of a protocol. In some examples, the protocol may be the FRRP. In some examples, the request message may be a topology notification message. In some examples, when the second port is part of a LAG, the request message may be transmitted using the LAG, which may select from any of the ports that are part of the LAG. In some examples, the request message may be transmitted using a control ring.

At the process 830, it is determined whether the request message is received on the first port. When the request message is received on the first port this means it may have been forwarded all the way around the ring and the failure detected during process 810 is no longer present. When the request message is received on the first port, the method 800 may return to process 810 until another failure at a port is detected. In some examples, when the request message is received on the first port, the switch may alternatively extract reachability data from the request message to verify the ring before returning to process 810. When the request message is not received on the first port, the switch waits for a response message on the second port using process 840.

At the process 840, it is determined whether a response message is received on the second port. Reception of the response message on the second port indicates that one of the switches in the ring was unable to forward the request message transmitted during process 820. When the response message is received, reachability data in the response message may be extracted using process 850. When the response message is not received, process 830 may again be used to determine whether the request message is received at the first port.

At the process 850, reachability data is extracted from the response message. As the request message transmitted during process 820 is forwarded around the ring, each of the switches that receive the request message may alter the request message to include reachability data as discussed previously with respect to method 700. Because the reachability data from the request message is also included in the response message, the switch may extract the reachability data from the response message. In some embodiments, the reachability data includes an indication of all the switches in the ring that can still be reached by the switch. In some examples, the reachability data may include a switch count, a bitmap, or route trace entries, etc.

As an example, when the request message is transmitted by switch 130 as a result of failure 410 at port 138, the response message may include reachability data for switches 120, 110, and 150 when failure 510 is also present in the ring and for switches 120, 110, 150, and 140 when failure 510 is not present in the ring.

At the optional process 860, a master switch and/or a network controller are notified. After the switch extracts the reachability data during process 850, the switch may notify the master switch and/or the network controller of a status of the ring. In some examples, the switch may transmit the reachability data to the master switch and/or the network controller. In some examples, the master switch may be master switch 110.

As discussed above and further emphasized here, FIGS. 7 and 8 are merely examples which should not unduly limit the scope of the claims. One of ordinary skill in the art would recognize many variations, alternatives, and modifications. In some embodiments, method 800 may further include a process for transmitting error recovery messages to the other switches in the ring when the entire ring is not reachable. In some embodiments, the method 800 may further include the processes of method 700 so that the switch may also update and forward request messages from other switches in the ring and forward response messages from other switches in the ring. In some examples, all of the switches in the ring perform both methods 700 and 800. In some embodiments, method 700 further includes processes for receiving a response message, extracting reachability data from the response message to determine which switches in the ring are reachable, and forwarding the response message.

Some embodiments of the switches 110, 120, 130, 140, and/or 150 may include non-transient, tangible, machine readable media that include executable code that when run by one or more processors may cause the one or more processors (e.g., the one or more processors of the control units 112, 122, 132, 142, and/or 152) to perform the processes of methods 200, 300, 600, 700, and/or 800 as described above. Some common forms of machine readable media that may include the processes of methods 200, 300, 600, 700, and/or 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A switch in a ring of switches, the switch comprising:
   a control unit;
   one or more first ports coupled to the control unit, each of the one or more first ports being configured to directly couple the switch to a first neighboring switch in the ring of switches; and
   one or more second ports coupled to the control unit, each of the one or more second ports being configured to directly couple the switch to a second neighboring switch in the ring of switches;
   wherein the control unit is configured to:
      transmit a first request message using one of the one or more first ports, the first request message including a first bitmap that includes a first plurality of bits representing each switch in the ring of switches, each of the first plurality of bits being initialized to an inactive state;
      transmit a second request message using one of the one or more second ports, the second request message including a second bitmap that includes a second plurality of bits representing each switch in the ring of switches, each of the second plurality of bits being initialized to the inactive state;
      receive a first response message on one of the one or more first ports, the first response message including the first bitmap, the first bitmap having been altered by switching one or more of the first plurality of bits to an active state to indicate each of one or more first switches in the ring of switches that received the first request message;
      receive a second response message on one of the one or more second ports, the second response message including the second bitmap, the second bitmap having been altered by switching one or more of the second plurality of bits to the active state to indicate each of one or more second switches in the ring of switches that received the second request message;
      detect a failure in the ring of switches in response to receiving the first response message and the second response message;
      extract the first bitmap from the first response message;
      determine a first reachability of each switch in the ring of switches via the one or more first ports by examining which of the first plurality of bits in the first bitmap are in the active state;
      extract the second bitmap from the second response message;
      determine a second reachability of each switch in the ring of switches via the one or more second ports by examining which of the second plurality of bits in the second bitmap are in the active state; and
      determine whether all of the ring of switches is reachable based on the first reachability and the second reachability.

2. The switch of claim 1 wherein the first request message further includes a count of a number of the one or more first switches.

3. The switch of claim 1 wherein logic one corresponds to the active state.

4. The switch of claim 1 wherein the first request message further includes a route trace entry for each of the one or more first switches.

5. The switch of claim 1, wherein the control unit is further configured to notify one or more devices selected from a group consisting of a master switch and a network controller of the failure.

6. The switch of claim 1, wherein the control unit is further configured to transmit one or more error recovery messages to the ring of switches.

7. The switch of claim 1, wherein the control unit is further configured to:
   receive a third request message including a third bitmap on a third port, the third bitmap including a third plurality of bits representing each switch in the ring of switches, wherein a bit among the third plurality of bits that represents the switch is initialized to an inactive state;
   alter the third request message to update the third bitmap by setting the bit that represents the switch to the active state;
   determine whether the altered third request message can be forwarded around the ring of switches;
   when the altered third request message can be forwarded around the ring of switches, forward the altered third request message; and
   when the altered third request message cannot be forwarded around the ring of switches:
      convert the altered third request message to a third response message; and
      transmit the third response message on a fourth port.

8. The switch of claim 7, wherein the third port and the fourth port are included in the one or more first ports.

9. The switch of claim 7, wherein the third port and the fourth port are included in the one or more second ports.

10. The switch of claim 1, wherein the control unit is further configured to:
    receive a third response message; and
    forward the third response message around the ring of switches.

11. A method of detecting a failure in a ring of switches, the method comprising:
    transmitting a first request message using one of one or more first ports of a first switch, each of the one or more first ports being configured to directly couple the first switch to a first neighboring switch in the ring of switches, the first request message including a first bitmap that includes a first plurality of bits representing each switch in the ring of switches, each of the first plurality of bits being initialized to an inactive state;
    transmitting a second request message using one of one or more second ports of the first switch, each of the one or more second ports being configured to directly couple the first switch to a second neighboring switch in the ring of switches, the second request message including a second bitmap that includes a second plurality of bits representing each switch in the ring of switches, each of the second plurality of bits being initialized to the inactive state;
    receiving a first response message on one of the one or more first ports, the first response message including the first bitmap, the first bitmap having been altered by switching one or more of the first plurality of bits to an active state to indicate each of one or more first switches in the ring of switches that received the first request message;
    receiving a second response message on one of the one or more second ports, the second response message including the second bitmap, the second bitmap having been altered by switching one or more of the second plurality of bits to the active state to indicate each of one or more second switches in the ring of switches that received the second request message;
    extracting the first bitmap from the first response message;
    determining a first reachability of each switch in the ring of switches via the one or more first ports by examining which of the first plurality of bits in the first bitmap are in the active state;
    extracting the second bitmap from the second response message;
    determining a second reachability of each switch in the ring of switches via the one or more second ports by examining which of the second plurality of bits in the second bitmap are in the active state; and
    determine whether all of the ring of switches is reachable based on the first reachability and the second reachability.

12. The method of claim 11, further comprising notifying one or more devices selected from a group consisting of a master switch and a network controller of the failure.

13. The method of claim 11, further comprising, transmitting one or more error recovery messages to the ring of switches.

14. An information handling system comprising:
    a ring of switches comprising a first switch and a second switch;
    the first switch comprising:
       a first control unit;
       one or more first ports coupled to the first control unit, each of the one or more first ports being configured to directly couple the first switch to a first neighboring switch in the ring of switches; and
       one or more second ports coupled to the first control unit, each of the one or more second ports being configured to directly couple the first switch to a second neighboring switch in the ring of switches;
    the second switch comprising:
       a second control unit;
       one or more third ports coupled to the second control unit, each of the one or more third ports being configured to couple the second switch to the first switch via one or more switches in the ring of switches including the first neighboring switch; and
       one or more fourth ports coupled to the second control unit, each of the one or more fourth ports being configured to couple the second switch to the first switch via one or more switches in the ring of switches including the second neighboring switch;
    wherein the first control unit is configured to:
       detect a failure in the ring of switches;
       transmit a first request message using one of the one or more first ports, the first request message including a first bitmap that includes a first plurality of bits representing each switch in the ring of switches, each of the first plurality of bits being initialized to an inactive state;
       transmit a second request message using one of the one or more second ports, the second request message including a second bitmap that includes a second plurality of bits representing each switch in the ring of switches, each of the second plurality of bits being initialized to the inactive state;
       receive a first response message on one of the one or more first ports, the first response message including the first bitmap, the first bitmap having been altered by switching one or more of the first plurality of bits to an active state to indicate each of one or more first switches in the ring of switches that received the first request message;

receive a second response message on one of the one or more second ports, the second response message including the second bitmap, the second bitmap having been altered by switching one or more of the second plurality of bits to an active state to indicate each of one or more second switches in the ring of switches that received the second request message;

extract the first bitmap from the first response message;

determine a first reachability of each switch in the ring of switches via the one or more first ports by examining which of the first plurality of bits in the first bitmap are in the active state;

extract the second bitmap from the second response message;

determine a second reachability of each switch in the ring of switches via the one or more second ports by examining which of the second plurality of bits in the second bitmap are in the active state; and determine whether all of the ring of switches is reachable based on the first reachability and the second reachability;

wherein the second control unit is configured to:

receive a third request message including a third bitmap on one of the one or more fourth ports, the third bitmap including a third plurality of bits representing each switch in the ring of switches, wherein a bit among the third plurality of bits that represents the second switch is initialized to an inactive state;

alter the third request message to update the third bitmap by setting the bit that represents the second switch to the active state;

determine whether the altered third request message can be forwarded on one of the one or more third ports;

when the altered third request message can be forwarded on one of the one or more third ports, forward the altered third request message on one of the one or more third ports;

when the altered third request message cannot be forwarded on one of the one or more third ports:
   convert the altered third request message to the first response message; and
   transmit the first response message on one of the one or more fourth ports;
   receive a third response message on one of the one or more third ports; and
   forward the third response message on one of the one or more fourth ports.

* * * * *